(12) United States Patent
Kum et al.

(10) Patent No.: US 8,901,267 B2
(45) Date of Patent: Dec. 2, 2014

(54) OLEFIN-BASED POLYMER AND PREPARATION METHOD THEREOF

(75) Inventors: Don-Ho Kum, Daejeon (KR); Eun-Jung Lee, Daejeon (KR); Jong-Joo Ha, Daejeon (KR); Choong-Hoon Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 24 days.

(21) Appl. No.: 13/703,236

(22) PCT Filed: Jul. 1, 2011

(86) PCT No.: PCT/KR2011/004859
§ 371 (c)(1),
(2), (4) Date: Dec. 10, 2012

(87) PCT Pub. No.: WO2012/002772
PCT Pub. Date: Jan. 5, 2012

(65) Prior Publication Data
US 2013/0085246 A1    Apr. 4, 2013

(30) Foreign Application Priority Data
Jul. 1, 2010    (KR) .......... 10-2010-0063578

(51) Int. Cl.
| | | |
|---|---|---|
| C08F 210/02 | (2006.01) | |
| C08F 210/14 | (2006.01) | |
| C08F 4/6592 | (2006.01) | |
| C09J 123/08 | (2006.01) | |
| C08F 210/16 | (2006.01) | |
| C08F 10/02 | (2006.01) | |
| C08F 4/659 | (2006.01) | |

(52) U.S. Cl.
CPC .............. *C08F 10/02* (2013.01); *C08F 210/16* (2013.01); *C08F 4/65908* (2013.01); *C09J 123/0815* (2013.01); *C08F 4/65912* (2013.01); *Y10S 526/943* (2013.01)
USPC ........ 526/348.2; 526/133; 526/160; 526/161; 526/348; 526/943; 502/103; 502/152; 502/167

(58) Field of Classification Search
CPC .. C08F 210/02; C08F 210/14; C08F 4/65902; C08F 4/65908; C08F 4/65924; C09J 123/0815
USPC .............. 526/133, 160, 161, 348, 348.2, 943; 502/103, 152, 167
See application file for complete search history.

(56) References Cited

U.S. PATENT DOCUMENTS

| | | |
|---|---|---|
| 6,054,544 A | 4/2000 | Finlayson et al. |
| 6,319,979 B1 | 11/2001 | Dubois |
| 2006/0025640 A1 | 2/2006 | Karjala et al. |
| 2007/0225158 A1* | 9/2007 | Lee et al. ................. 502/152 |

FOREIGN PATENT DOCUMENTS

| | | |
|---|---|---|
| CN | 101711260 A | 5/2010 |
| KR | 1020080101542 | 11/2008 |
| KR | 1020080101791 | 11/2008 |

* cited by examiner

*Primary Examiner* — Caixia Lu
(74) *Attorney, Agent, or Firm* — McKenna Long & Aldridge, LLP

(57) ABSTRACT

The present invention relates to an olefin-based polymer which exhibits superior processability and superior adhesive properties and therefore is desirably applicable to a hot-melt adhesive (HMA) or the like, and a preparation method thereof. The olefin-based polymer has a molecular weight distribution (Mw/Mn, PDI) of 2~3, and a density of 0.85 to 0.88 g/cm$^3$, and satisfies the relation of Tc−Tm>0, wherein Tc (° C.) is a crystallization temperature and Tm (° C.) is a melting point.

12 Claims, 1 Drawing Sheet

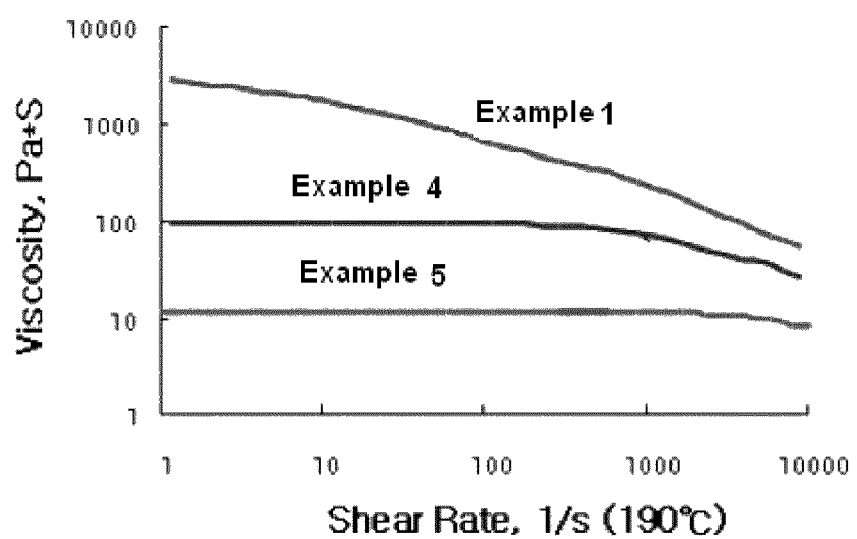

OLEFIN-BASED POLYMER AND PREPARATION METHOD THEREOF

CROSS-REFERENCE TO RELATED APPLICATIONS

This application is a National Stage Entry of International Application No. PCT/KR2011/004859, filed Jul. 1, 2011, and claims the benefit of Korean Application No. 10-0063578, filed on Jul. 1, 2010, which are hereby incorporated by reference in their entirety for all purposes as if fully set forth herein.

TECHNICAL FIELD

The present invention relates to an olefin-based polymer and a preparation method thereof. More particularly, the present invention relates to an olefin-based polymer which exhibits superior processability and superior adhesive properties and therefore is desirably applicable to a hot-melt adhesive (HMA) or the like, and a preparation method thereof.

BACKGROUND ART

Preparation and application of polyolefins have been rapidly developed with a development of a catalyst called a Ziegler-Natta catalyst, and a variety of production processes and applications of the products have been also developed. Recently, metallocene catalysts have been commonly used in the preparation of polyolefins, and metallocene catalysts discovered by kaminsky's group in 1980 are composed of a transition metal as a main catalyst and an organic aluminium compound as a co-catalyst. The metallocene catalyst is a homogeneous complex catalyst having a single active site, and produces polymers with a narrow molecular weight distribution and a uniform comonomer distribution according to the single-site characteristics. In addition, the metallocene catalyst has the properties of controlling the stereoregularity, copolymerization characteristics, molecular weight, crystallinity, and so forth of the obtained polymer by changing the ligand structure of the catalyst and the polymerization conditions.

Meanwhile, there have been attempts to apply an olefin-based polymer prepared by using the metallocene catalyst to hot-melt adhesive (HMA), and the hot-melt adhesive is required to exhibit superior melt processability and superior adhesive properties at low temperature. However, since most of the previously known olefin-based polymers did not satisfy both of the melt processability and the adhesive properties, there has been a limit in their application to the hot-melt adhesive.

SUMMARY OF THE INVENTION

The present invention relates to an olefin-based polymer which exhibits superior processability and superior adhesive properties and therefore is desirably applicable to a hot-melt adhesive (HMA) or the like, and a preparation method thereof.

Accordingly, the present invention provides an olefin-based polymer that has a molecular weight distribution (Mw/Mn, PDI) of 2~3, and a density of 0.85 to 0.88 g/cm$^3$, and satisfies the relation of Tc−Tm>0, wherein Tc (° C.) is a crystallization temperature and Tm (° C.) is a melting point.

Further, the present invention provides a preparation method of the olefin-based polymer, including the step of polymerizing olefin-based monomers in the presence of a catalyst composition including a transition metal compound of the following Chemical Formula 1 and one or more co-catalysts selected from the group consisting of the following Chemical Formulae 4 to 6:

[Chemical Formula 1]

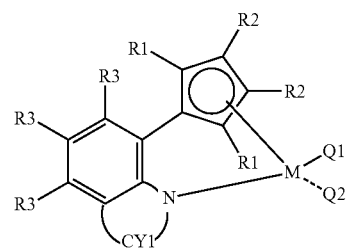

wherein R1 and R2 are the same as or different from each other, and each independently hydrogen; an alkyl radical having 1 to 20 carbon atoms; an alkenyl radical having 2 to 20 carbon atoms; an aryl radical having 6 to 20 carbon atoms; a silyl radical; an alkylaryl radical having 7 to 20 carbon atoms; an arylalkyl radical having 7 to 20 carbon atoms; or a Group 4 metalloid radical substituted with hydrocarbyl; or R1 and R2 or two R2s may be connected to each other by an alkylidene radical containing an alkyl radical having 1 to 20 carbon atoms or an aryl radical having 6 to 20 carbon atoms so as to form a ring;

R3s are the same as or different from each other, and each independently hydrogen; a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or amido radical; or two or more of R3s may be connected to each other so as to form an aliphatic or aromatic ring;

CY1 is a substituted or unsubstituted aliphatic or aromatic ring, in which CY1 may be substituted with a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; or if a plurality of substituents are present, two or more thereof may be connected to each other so as to form an aliphatic or aromatic ring;

M is a Group 4 transition metal; and

Q1 and Q2 are the same as or different from each other, and each independently a halogen radical; an alkyl radical having 1 to 20 carbon atoms; an alkenyl radical having 2 to 20 carbon atoms; an aryl radical having 6 to 20 carbon atoms; an alkylaryl having 7 to 20 carbon atoms; arylalkyl radical having 7 to 20 carbon atoms; an alkyl amido radical having 1 to 20 carbon atoms; an aryl amido radical having 6 to 20 carbon atoms; or alkylidene radical having 1 to 20 carbon atoms,

[Chemical Formula 4]

wherein R8s are the same as or different from each other, and each independently halogen; a hydrocarbon having 1 to 20 carbon atoms; or a hydrocarbon having 1 to 20 carbon atoms which is substituted with halogen; and n is an integer of 2 or more;

[Chemical Formula 5]

D(R8)₃ wherein R8 is the same as defined in Chemical Formula 4; and D is an aluminium or boron;

[Chemical Formula 6]

[L-H]⁺[ZA₄]⁻ or [L]⁺[ZA₄]⁻ wherein L is a neutral or cationic Lewis acid; H is a hydrogen atom; Z is an element of Group 13; and As are the same as or different from each other, and each independently an aryl group having 6 to 20 carbon atoms, or an alkyl group having 1 to 20 carbon atoms, at which one or more hydrogen atoms are unsubstituted or substituted with halogen, hydrocarbon having 1 to 20 carbon atoms, alkoxy, or phenoxy.

ADVANTAGEOUS EFFECTS

It was revealed that the olefin-based polymer according to the present invention has a narrow molecular weight distribution, a low melting point, and a relatively high crystallization temperature so as to exhibit superior processability and superior adhesive properties at the same time. The olefin-based polymer can be prepared by polymerization of olefin-based monomers using a particular transition metal compound and co-catalyst.

Therefore, it was found that the olefin-based polymer can be very desirably applied to hot-melt adhesives (HMA) or the like.

BRIEF DESCRIPTION OF THE DRAWINGS

FIG. 1 is a graph showing a relationship between viscosity and shear rate of the olefin-based polymers of Examples 1, 4 and 5.

DETAILED DESCRIPTION OF THE EMBODIMENTS

Hereinafter, an olefin-based polymer according to specific embodiments of the present invention and a preparation method thereof will be described.

According to one embodiment of the present invention, provided is an olefin-based polymer that has a molecular weight distribution (Mw/Mn, PDI) of 2~3, and preferably 2~2.5, and a density of 0.85 to 0.88 g/cm³, and preferably 0.855 to 0.875 g/cm³, and satisfies the relation of Tc−Tm>0, preferably more than 0 and 30 or less, and more preferably 5 or more and 20 or less, wherein Tc (° C.) is a crystallization temperature and Tm (° C.) is a melting point.

As substantiated by the following Examples, the experimental results of the present inventors showed that an olefin-based polymer having a relatively narrow molecular weight distribution and a low density, and satisfying the relation of Tc−Tm>0, wherein Tc is a crystallization temperature and Tm is a melting point, can be provided by polymerization of olefin-based monomers using a particular transition metal compound and co-catalyst.

The olefin-based polymer has a relatively low melting point and a relatively high crystallization temperature, compared to the previously known olefin-based polymers having a molecular weight or a density at an equivalent level. Such olefin-based polymer is melted at a relatively low melting point, and thus can be adhesive. In addition, since its crystallization temperature is higher than the melting point, the olefin-based polymer can be more rapidly crystallized while it is cooled after melted-processed, and can exhibit adhesive properties. As a result, it is able to exhibit more excellent adhesive properties, processability, and processing speed than the previously known olefin-based polymers.

Additionally, the olefin-based polymer can maintain the low density and the relatively narrow molecular weight distribution that are suitable for hot-melt adhesives or the like, while satisfying the above described characteristics, thereby showing excellent physical properties. Therefore, the olefin-based polymer can be very desirably applied to hot-melt adhesives or the like.

The olefin-based polymer may have a weight average molecular weight (Mw) of approximately 1,000 to 80,000, preferably approximately 10,000 to 50,000, and more preferably approximately 10,000 to 30,000. As the olefin-based polymer has a molecular weight in the range of such a low level, it is able to show lower viscosity after melted. Consequently, the olefin-based polymer can exhibit more improved processability.

When the olefin-based polymer was prepared to have a molecular weight lower than approximately 1,000 to 30,000, the olefin-based polymer may have a melt index of approximately more than 500 g/10 min under a load of approximately 2.16 kg, and a zero shear viscosity of approximately 20 Pa*S or less which is measured at approximately 190° C. When the olefin-based polymer is polymerized to have a low molecular weight, it can exhibit ultra high fluidity, satisfying the melt index and the viscosity in the above mentioned range. As the olefin-based polymer exhibits ultra high fluidity, the olefin-based polymer is able to show more excellent processability, processing speed or the like, and therefore can be more preferably applied to hot-melt adhesives or the like.

As described above, the olefin-based polymer can have a relatively low melting point and a relatively high crystallization temperature, compared to the previously known olefin-based polymers having a molecular weight or a density at an equivalent level. More specifically, the olefin-based polymer may have a crystallization temperature Tc (° C.) of 60 to 90° C. and a melting point Tm (° C.) of 50 to 70° C., and preferably a crystallization temperature Tc (° C.) of 60 to 80° C. and a melting point Tm (° C.) of 50 to 65° C. As the above ranges of the crystallization temperature and the melting point are compared to those of the previously known olefin-based polymers at an equivalent level, the melting point is approximately 5° C. or lower and the crystallization temperature is approximately 8° C. or higher. In particular, the previously known olefin-based polymers at an equivalent level did not satisfy the relation of Tc−Tm>0. Because of the high melting point, the conventional olefin-based polymers were difficult to exhibit excellent adhesive properties, especially, at a low temperature. In addition, because the crystallization temperature is generally lower than the melting point, it is difficult to achieve high-speed processing upon melting processing, which is one of the factors that makes it difficult to obtain excellent adhesive properties. In contrast, the olefin-based polymer of one embodiment can maintain its crystallization temperature and melting point in the above ranges while satisfying the relation of Tc−Tm>0, and therefore it is able to exhibit superior adhesive properties and superior processability such as high-speed processing due to rapid crystallization.

Meanwhile, the above mentioned olefin-based polymer may be an ethylene-alpha olefin copolymer, and the alpha olefin may be one or more selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene. More specifically, the olefin-based polymer may be an ethylene-1-octene copolymer or an ethylene-1-hexene copolymer to be more preferably used as a hot-melt adhesive or the like.

In the ethylene-alpha olefin copolymer, the molar ratio of ethylene:alpha olefin may be 1:100 to 100:1, preferably 1:10 to 10:1, and more preferably 1:5 to 2:1. Further, the weight ratio of the alpha olefin to the total weight of the copolymer may be, for example, approximately 10 to 90% by weight, preferably approximately 20 to 80% by weight, and more preferably approximately 30 to 60% by weight. The ethylene-alpha olefin copolymer can show proper physical properties such as relatively low density or molecular weight, as the content of the comonomer such as alpha olefin meets the above range.

According to another embodiment of the present invention, a preparation method of the above mentioned olefin-based polymer is provided. The preparation method may include the step of polymerizing olefin-based monomers in the presence of a catalyst composition including a transition metal compound of the following Chemical Formula 1 and one or more co-catalysts selected from the group consisting of the following Chemical Formulae 4 to 6:

[Chemical Formula 1]

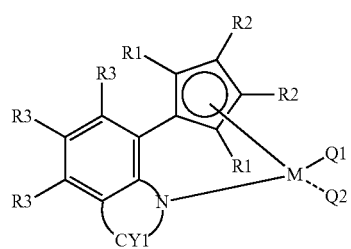

wherein R1 and R2 are the same as or different from each other, and each independently hydrogen; an alkyl radical having 1 to 20 carbon atoms; an alkenyl radical having 2 to 20 carbon atoms; an aryl radical having 6 to 20 carbon atoms; a silyl radical; an alkylaryl radical having 7 to 20 carbon atoms; an arylalkyl radical having 7 to 20 carbon atoms; or a Group 4 metalloid radical substituted with hydrocarbyl; or R1 and R2 or two R2s may be connected to each other by an alkylidene radical containing an alkyl radical having 1 to 20 carbon atoms or an aryl radical having 6 to 20 carbon atoms so as to form a ring;

R3s are the same as or different from each other, and each independently hydrogen; a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or amido radical; or two or more of R3s may be connected to each other so as to form an aliphatic or aromatic ring;

CY1 is a substituted or unsubstituted aliphatic or aromatic ring, in which CY1 may be substituted with a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; or if a plurality of substituents are present, two or more thereof may be connected to each other so as to form an aliphatic or aromatic ring;

M is a Group 4 transition metal; and

Q1 and Q2 are the same as or different from each other, and each independently a halogen radical; an alkyl radical having 1 to 20 carbon atoms; an alkenyl radical having 2 to 20 carbon atoms; an aryl radical having 6 to 20 carbon atoms; an alkylaryl having 7 to 20 carbon atoms; arylalkyl radical having 7 to 20 carbon atoms; an alkyl amido radical having 1 to 20 carbon atoms; an aryl amido radical having 6 to 20 carbon atoms; or alkylidene radical having 1 to 20 carbon atoms,

[Chemical Formula 4]

—[Al(R8)-O]$_n$— wherein R8s are the same as or different from each other, and each independently halogen; a hydrocarbon having 1 to 20 carbon atoms; or a hydrocarbon having 1 to 20 carbon atoms which is substituted with halogen; and n is an integer of 2 or more;

[Chemical Formula 5]

D(R8)$_3$ wherein R8 is the same as defined in Chemical Formula 4; and D is an aluminium or boron;

[Chemical Formula 6]

[L-H]$^+$[ZA$_4$]$^-$ or [L]$^+$[ZA$_4$]$^-$ wherein L is a neutral or cationic Lewis acid; H is a hydrogen atom; Z is an element of Group 13; and As are the same as or different from each other, and each independently an aryl group having 6 to 20 carbon atoms, or an alkyl group having 1 to 20 carbon atoms, at which one or more hydrogen atoms are unsubstituted or substituted with halogen, hydrocarbon having 1 to 20 carbon atoms, alkoxy, or phenoxy.

When polymerization of olefin-based monomers (e.g., copolymerization of ethylene and alpha olefin) is performed using the transition metal compound of Chemical Formula 1 as a catalyst and one or more co-catalysts selected from Chemical Formulae 4 to 6, the olefin-based polymer satisfying the physical properties of one embodiment can be prepared. It is inferred that the co-catalyst properly activates the catalyst of the transition metal compound so as to prevent generation of excessively long polymer chains, and the catalyst and the co-catalyst randomize binding of the olefin-based monomers (e.g., random copolymerization of ethylene and alpha olefin without formation of block copolymers). Consequently, the olefin-based polymer of one embodiment, which exhibits a lower melting point and a higher crystallization temperature, can be prepared.

On the other hand, the transition metal compound of Chemical Formula 1 is more preferably a transition metal compound represented by the following Chemical Formula 2 or 3, in order to control electronic and steric environments in the vicinity of the central metal.

[Chemical Formula 2]

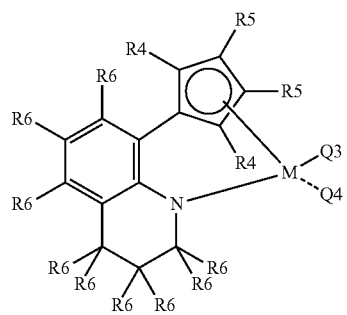

[Chemical Formula 3]

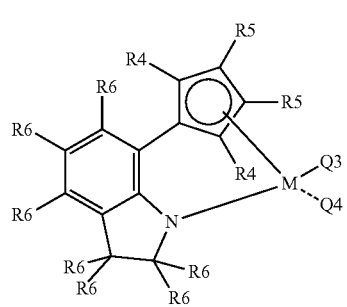

wherein R4s and R5s are the same as or different from each other, and each independently hydrogen; an alkyl radical having 1 to 20 carbon atoms; an aryl radical having 6 to 20 carbon atoms; or a silyl radical;

R6s are the same as or different from each other, and each independently hydrogen; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; two or more of R6s may be connected to each other so as to form an aliphatic or aromatic ring;

Q3 and Q4 are the same as or different from each other, and each independently a halogen radical; an alkyl radical having 1 to 20 carbon atoms; an alkyl amido radical having 1 to 20 carbon atoms; or an aryl amido radical having 6 to 20 carbon atoms;

M is a Group 4 transition metal.

In Chemical Formula 1, more preferred compounds to control the electronic or steric environment around the central metal include transition metal compounds of following structures:

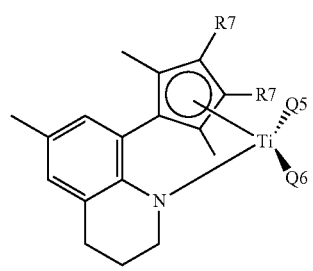

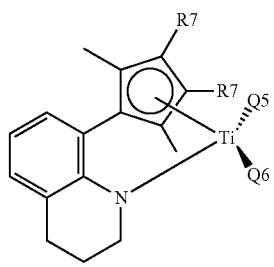

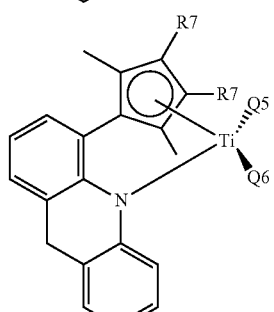

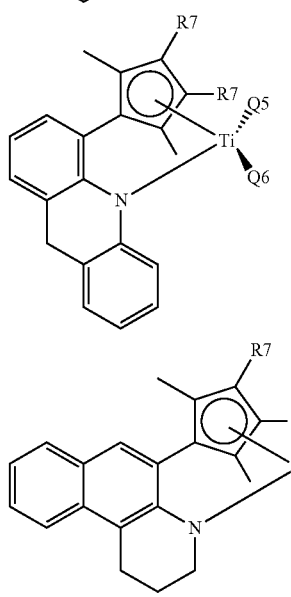

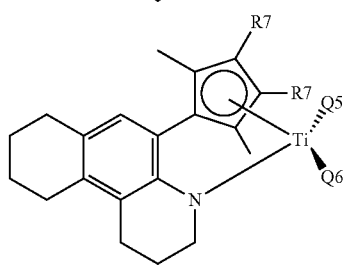

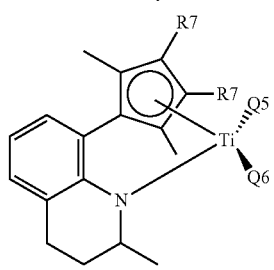

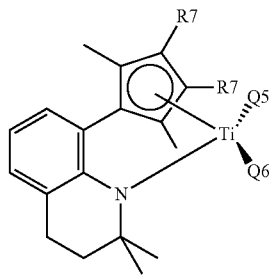

-continued

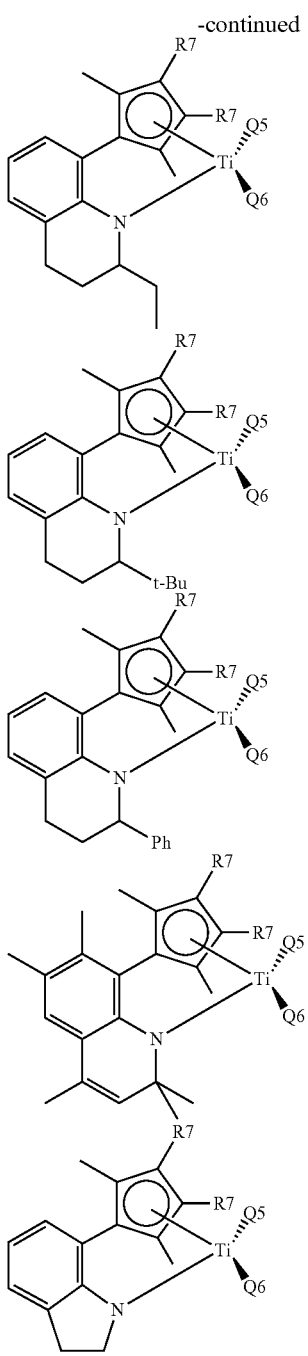

wherein R7s are the same as or different from each other, and each independently selected from a hydrogen or methyl radical, Q5 and Q6 are the same as or different from each other, and each independently selected from a methyl radical, a dimethylamido radical or a chloride radical.

Examples of the compound of Chemical Formula 4 used as the co-catalyst include methylaluminoxane, ethylaluminoxane, isobutylaluminoxane, butylaluminoxane, etc. Among them, methylaluminoxane may be preferably used.

Further, examples of the compound represented by Chemical Formula 5 include trimethylaluminium, triethylaluminium, triisobutylaluminium, tripropylaluminium, tributylaluminium, dimethylchloroaluminium, triisopropylaluminium, tri-s-butylaluminium, tricyclopentylaluminium, tripentylaluminium, triisopentylaluminium, trihexylaluminium, trioctylaluminium, ethyldimethylaluminium, methyldiethylaluminium, triphenylaluminium, tri-p-tolylaluminium, dimethylaluminiummethoxide, dimethylaluminiumethoxide, trimethylboron, triethylboron, triisobutylboron, tripropylboron, tributylboron, etc. Among them, trimethylaluminium, triethylaluminium or triisobutylaluminium may be more preferably used.

Further, examples of the compound represented by Chemical Formula 6 include triethylammonium tetraphenyl boron, tributylammonium tetraphenyl boron, trimethylammonium tetraphenyl boron, tripropylammonium tetraphenyl boron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenyl boron, N,N-diethylanilinium tetraphenyl boron, N,N-diethylanilinium tetraphenyl boron, N,N-diethylanilinium tetrapentafluorophenyl boron, diethylammonium tetrapentafluorophenyl boron, triphenylphosphonium tetraphenyl boron, trimethylphosphonium tetraphenyl boron, octadecylmethylammonium tetrakis(pentafluorophenyl)boron, triethylammonium tetraphenyl aluminium, tributylammonium tetraphenyl aluminium, trimethylammonium tetraphenyl aluminium, tripropylammonium tetraphenyl aluminium, trimethylammonium tetra(p-tolyl)aluminium, tripropylammonium tetra(p-tolyl)aluminium, triethylammonium tetra(o,p-dimethylphenyl)aluminium, tributylammonium tetra(p-trifluoromethylphenyl)aluminium, trimethylammonium tetra(p-trifluoromethylphenyl)aluminium, tributylammonium tetrapentafluorophenyl aluminium, N,N-diethylanilinium tetraphenyl aluminium, N,N-diethylanilinium tetrapentafluorophenyl aluminium, diethylammonium tetrapentatetraphenyl aluminium, triphenylphosphonium tetraphenyl aluminium, trimethylphosphonium tetraphenyl aluminium, tripropylammonium tetra(p-tolyl)boron, triethylammonium tetra(o,p-dimethylphenyl)boron, tributylammonium tetra(p-trifluoromethylphenyl)boron, N,N-diethylanilinium tetraphenyl boron, triphenylcarbonium tetra(p-trifluoromethylphenyl)boron, triphenylcarbonium tetrapentafluorophenyl boron, etc.

In the preparation method of another embodiment, the catalyst composition including the above mentioned transition metal compound of Chemical Formula 1 and one or more co-catalysts of Chemical Formulae 4 to 6 is used, and such catalyst composition can be obtained by simply mixing and contacting the transition metal compound with one or more co-catalysts. However, the catalyst composition may include the compound of Chemical Formula 4 or 5, together with the compound of Chemical Formula 6. In this case, the transition metal compound is contacted with the compound of Chemical Formula 4 or 5 so as to obtain a mixture, and then the compound of Chemical Formula 6 is added to the mixture so as to obtain the catalyst composition.

In the preparation method, the transition metal compound and the co-catalyst may be used in the molar ratio of the transition metal compound:the co-catalyst from 1:1 to 1:10000. When the molar ratio is within the above range, the co-catalyst properly activates the transition metal while minimizing the possibility of remaining the co-catalyst in the excessive amount. Accordingly, the olefin-based polymer satisfying the physical properties of one embodiment can be more preferably obtained, and the economic feasibility of the process and the purity of the polymer can be also improved.

More specifically, if the co-catalyst includes any one of Chemical Formulae 4 to 6, the molar ratio of the transition metal compound:the co-catalyst may be 1:1 to 1:10000, preferably 1:10 to 1:10000, more preferably 1:100 to 1:5,000, and most preferably 1:500 to 1:2000.

Further, if the co-catalyst includes any one of Chemical Formulae 4 to 6 together with the compound of Chemical Formula 6, the molar ratio of the transition metal compound of Chemical Formula 1:the compound of Chemical Formula 4 or 5 may be 1:2 to 1:5000, preferably 1:10 to 1:1000, and more preferably 1:20 to 1:500. The compound of Chemical Formula 4 or 5 alkylates the transition metal compound, and the compound of Chemical Formula 6 activates the alkylated transition metal compound. If the molar ratio is not within the above range, the alkylation does not occur properly or a side reaction occurs between the excessive amount of the compound of Chemical Formula 4 or 5 and the compound of Chemical Formula 6, and thus proper activation of the transition metal compound does not occur.

Further, the molar ratio of the transition metal compound of Chemical Formula 1:the compound of Chemical Formula 6 may be 1:1 to 1:25, preferably 1:1 to 1:10, and more preferably 1:1 to 1:5. If the molar ratio is not within the above range, proper activation of the transition metal compound may not occur so as to decrease activity of the catalyst composition, or the excessive amount of the activating agent may reduce the economic feasibility or the purity of the polymer.

Additionally, when the molar ratio of the transition metal compound:the co-catalyst is more than 1:10, for example, 1:10 to 1:10000, that is, a relatively high amount of the co-catalyst is used, and hydrogen gas is injected at a flow rate of, for example, 3.00 L/h or more, preferably 3.00 to 10.0 L/h in the polymerization step, the olefin-based polymer with ultra-high fluidity can be prepared. The olefin-based polymer with ultra-high fluidity thus prepared may have a melt index of more than approximately 500 g/10 min under a load of approximately 2.16 kg and a zero shear viscosity of approximately 20 Pa*S or less which is measured at approximately 190° C.

To prepare the olefin-based polymer with ultra-high fluidity, its weight average molecular weight should be as low as 1,000 to 30,000. When the relatively high amount of the co-catalyst is used and hydrogen gas is added, early termination of polymer chain extension can be achieved. Consequently, the above mentioned low-molecular weight olefin-based polymer with ultra-high fluidity can be prepared, and this polymer is able to exhibit more improved processability and processing speed.

In order to prepare the above mentioned catalyst composition, the transition metal compound and the co-catalyst may be dissolved in a solvent, and the solvent may be a hydrocarbon solvent such as pentane, hexane and heptane, or an aromatic solvent such as benzene and toluene. In addition, the transition metal compound and the co-catalyst may be used as supported on a support such as silica, alumina or the like.

As described above, the olefin-based polymer may be an ethylene-alpha olefin copolymer. In order to prepare this copolymer, polymerization may be performed using alpha olefin selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene, together with ethylene, as the olefin-based monomers.

In the preparation method of the polymer, a scavenger is further used together with the above mentioned catalyst composition so as to perform the polymerization step. The scavenger may be exemplified by a compound represented by the following Chemical Formula 7, and other various scavengers may be also used:

[Chemical Formula 7]

$$D(R)_3$$

wherein Rs are each independently halogen; hydrocarbon having 1 to 20 carbon atoms; or hydrocarbon having 1 to 20 carbon atoms which is substituted with halogen; and D is aluminium or boron.

Specific examples of the scavenger include trimethylaluminium, triethylaluminium, triisobutylaluminium, tripropylaluminium, tributylaluminium, dimethylchloroaluminium, triisopropylaluminium, tri-s-butylaluminium, tricyclopentylaluminium, tripentylaluminium, triisopentylaluminium, trihexylaluminium, trioctylaluminium, ethyldimethylaluminium, methyldiethylaluminium, triphenylaluminium, tri-p-tolylaluminium, dimethylaluminiummethoxide, dimethylaluminiumethoxide, trimethylboron, triethylboron, triisobutylboron, tripropylboron, tributylboron, etc. Among them, trimethylaluminium, triethylaluminium, or triisobutylaluminium may be more preferably used.

The scavenger may be injected to a reactor separately with the above mentioned catalyst composition, and it may be used in a typical amount previously known so as to improve yield of the polymer.

In the preparation method of the olefin-based polymer, the polymerization step may be carried out under the typical reaction conditions for olefin-based polymers. First, the polymerization step may be carried out by a continuous solution polymerization process.

In such polymerization process, the above mentioned catalyst composition and olefin-based monomers, and optionally the scavenger are first introduced to the reactor. The solvent for polymerization reaction is injected to the reactor. Thus, a mixture of the solvent, the catalyst composition, the olefin-based monomers, and optionally the scavenger is present in the reactor.

The solvent for polymerization reaction may include an aliphatic hydrocarbon solvent having 5 to 12 carbon atoms such as pentane, hexane, heptane, nonane, decane, and isomers thereof; an aromatic hydrocarbon solvent such as toluene and benzene; a hydrocarbon solvent substituted with chlorine such as dichloromethane and chlorobenzene; and mixtures thereof, but is not limited thereto. However, the preferred solvent is n-hexane, considering polymerization reactivity.

When ethylene and alpha olefin are used as the olefin-based monomers, the molar ratio of ethylene:alpha olefin may be 1:100 to 100:1, as described above. If the molar ratio is not within the above range, it is difficult to achieve the physical properties of one embodiment such as the low density, as described above. Also, since the residual amount of the unreacted alpha olefin is too large, the conversion rate is decreased, and consequently the process recycling may be increased.

The solvent for polymerization reaction may be used in the molar ratio of ethylene:solvent from 1:10000 to 10:1, and preferably from 1:100 to 5:1, which is a ratio suitable for dissolving the olefin-based monomers, smooth transportation of the produced copolymer, and improvement of economic feasibility of the equipment and the process.

The solvent is injected at −40 to 150° C. using a heater or freezer, and thus polymerization reaction is initiated with the mixture of the monomers and the catalyst composition. If the solvent temperature is lower than −40° C., the solvent temperature is too low, and the reaction temperature is also decreased, and thus it is difficult to control the temperature, even though there is some difference depending on the reaction amount. If the solvent temperature is higher than 150° C., the solvent temperature is too high, and thus it is difficult to control the heat of reaction.

Further, the pressure is increased to 50 bar or higher using a high-capacity pump installed in the reactor, and then the materials (solvent, monomer, catalyst composition, etc.) are supplied, thereby passing the mixed material through the reactor without arrangement of reactor, and additional pumping between a pressure drop device and a separator.

The internal pressure of the reactor is 1 to 300 bar, preferably 30 to 200 bar, and most preferably 50 to 100 bar. If the internal pressure is less than 1 bar, the reaction rate is lowered to reduce the productivity and vaporization of the solvent is caused. If the internal pressure is more than 300 bar, the equipment cost is increased due to high pressure.

The olefin-based polymer prepared by the above mentioned method exhibits excellent adhesive properties and processability, thereby being very preferably used in hot-melt adhesives or the like, and in particular, it can be used in various applications such as packaging for vehicles, electric wires, toys, fibers, and medical materials, construction materials, and housewares.

Hereinafter, the present invention will be described in more detail with reference to the following Examples. However, these Examples are for illustrative purposes only, and the scope of the present invention is not intended to be limited by these Examples.

EXAMPLE

Examples 1 to 5

Preparation of Ethylene-Alpha Olefin Copolymer

A hexane solvent, ethylene, and 1-octene monomers were supplied into a 1.5 L continuous stirred reactor which was preheated to 100 to 150° C. at a pressure of 89 bars. A [(7-Methyl-1,2,3,4-tetrahydroquinolin-8-yl)trimethylcyclopentadienyl-eta5,kappa-N]titanium dimethyl compound belonging to the category of Chemical Formula 1 (LGC001, LG Chem), an octadecylmethylammonium tetrakis(pentafluorophenyl)boron co-catalyst, and a trimethylaluminium scavenger were supplied from a catalyst storage tank to the reactor to perform copolymerization reaction. The polymerization was performed at the temperature of the following Table 1. The pressure of polymer solution produced by the copolymerization reaction was reduced to 7 bar at the end of the reactor, and then supplied into a solvent separator which was preheated to 230° C. to remove almost of the solvent by a solvent separation process. The residual solvent was completely removed from the copolymers, which were supplied into a second separator by a pump, using a vacuum pump, and then the copolymer was passed through cooling water and a cutter to give particulate polymers. The polymerization conditions of Examples 1 to 5 are summarized in the following Table 1.

TABLE 1

|  | Example 1 | Example 2 | Example 3 | Example 4 | Example 5 |
|---|---|---|---|---|---|
| Hx (kg/h) | 3.36 | 3.36 | 3.36 | 3.36 | 3.36 |
| Ethylene (kg/h) | 0.63 | 0.63 | 0.63 | 0.63 | 0.63 |
| 1-Octene (kg/h) | 0.55 | 0.55 | 0.55 | 0.55 | 0.55 |
| Catalyst (μmol/min) | 0.50 | 0.50 | 0.50 | 0.50 | 0.50 |
| Co-catalyst (μmol/min) | 3.00 | 3.00 | 3.00 | 3.00 | 6.00 |
| Scavenger (μmol/min) | 20 | 20 | 20 | 20 | 20 |
| H$_2$ (L/h) | 0.80 | 1.00 | 2.00 | 3.00 | 3.00 |
| Temperature (° C.) | 155 | 155 | 153 | 152 | 153 |
| Pressure (bar) | 89 | 89 | 89 | 89 | 89 |

Comparative Examples 1 to 3

Commercialized Ethylene-Alpha Olefin Copolymer

An ethylene-alpha olefin copolymer, EG8200 commercialized by Dow chemical was used as Comparative Example 1, GA1950 was used as Comparative Example 2, and GA1900 was used as Comparative Example 3.

Experimental Example 1

Measurement of Physical Properties of Ethylene-Alpha Olefin Copolymer

Density, melt index (MI$_{2.16}$), molecular weight, molecular weight distribution (PDI), crystallization temperature, melting point, comonomer (alpha olefin) content, and shear rate viscosity of the ethylene-alpha olefin copolymers of Examples 1 to 5 and Comparative Examples 1 to 3 were measured as follows:

(1) Density: measured in accordance with ASTM D792

(2) Melt index (MI$_{2.16}$): measured in accordance with ASTM D1238

(3) Molecular weight and molecular weight distribution (PDI): measured by high-temperature GPC (PL-GPC220)

(4) Comonomer content: measured by $^{13}$C-NMR (5) Melting point (Tm): the temperature was increased to 200° C., maintained at that temperature for 5 minutes, and decreased to 30° C. Then, the temperature was increased again and the summit of the DSC (Differential Scanning Calorimeter, manufactured by TA) curve was determined as the melting point. The temperature was increased and decreased at a rate of 10° C./min, and the melting point was obtained in a second temperature increase period.

(6) Crystallization temperature (Tc): the temperature was decreased under the same conditions as in the melting point and the summit of the DSC (Differential Scanning Calorimeter, manufactured by TA) curve was determined as the crystallization point.

(7) Shear rate viscosity: viscosity changes of the melted copolymers were measured at 190° C. with increasing shear rate using a capillary rheometer.

The results of measuring density, melt index (MI$_{2.16}$), molecular weight, molecular weight distribution (PDI), crystallization temperature, melting point, and comonomer content of the ethylene-alpha olefin copolymers of Examples 1 to 5 and Comparative Examples 1 to 3 are summarized in the following Table 2, and the results of measuring shear rate viscosity of Examples 1, 4 and 5 are depicted in FIG. 1.

TABLE 2

|  | Density (g/cm³) | MI₂.₁₆ (g/10 min) | Mw | PDI | Tm (° C.) | Tc (° C.) | Tc − Tm | Comonomer content (wt %) |
|---|---|---|---|---|---|---|---|---|
| Comparative Example 1 | 0.870 | 5.0 | 77067 | 2.03 | 62.3 | 45.1 | −17.2 | |
| Comparative Example 2 | 0.874 | 500 | 23692 | 2.00 | 73.7 | 56.5 | −17.2 | |
| Comparative Example 3 | 0.870 | 1000 | 20404 | 2.00 | 69.5 | 53.1 | −16.4 | |
| Example 1 | 0.870 | 5.0 | 76220 | 2.15 | 54.9 | 62.7 | 7.8 | 36.35 |
| Example 2 | 0.870 | 11 | 55977 | 2.18 | 53.7 | 67.3 | 13.6 | 36.14 |
| Example 3 | 0.870 | 18 | 48458 | 2.20 | 57.6 | 72.0 | 14.4 | 35.28 |
| Example 4 | 0.870 | 48 | 37277 | 2.25 | 58.1 | 78.1 | 20 | 35.28 |
| Example 5 | 0.870 | More than 500 | 21872 | 2.23 | 62.4 | 77.9 | 15.5 | 35.06 |

Referring to Table 2, it was found that the copolymers of Examples 1 to 5 exhibited a relatively narrow PDI, a relatively high crystallization temperature, and a relatively low melting point, while showing the density and molecular weight at an equivalent level to those of Comparative Examples 1 to 3.

Accordingly, it is expected that the copolymers of Examples 1 to 5 are melted at a relatively low melting point or higher so as to show adhesive properties, and its rapid crystallization occurs at a temperature higher than the melting point, thereby showing excellent adhesive properties and processing speed. In contrast, since the copolymers of Comparative Examples 1 to 3 have a relatively high melting point and a relatively low crystallization temperature, it is difficult to show adhesive properties equivalent to those of Examples. Also, the rapid crystallization does not occur in the melt state and processability is poor.

Referring to FIG. 1 and Table 2, the polymer of Example 5, which was prepared by increasing the hydrogen injection amount and the ratio of the co-catalyst, had a melt index of more than 500 g/10 min under a load of 2.16 kg and a zero shear viscosity of approximately 10 Pa*S which was derived from FIG. 1, indicating ultra-high fluidity. Thus, it was found that the polymer is able to show superior processability and processing speed.

Experimental Example 2

Test on Adhesive Properties of Ethylene-Alpha Olefin Copolymer

The adhesive properties of the ethylene-alpha olefin copolymers of Comparative Examples 2 and 3 and Example 5 were compared by a peel test method. A sample solution prepared by swelling the copolymer in a hexane solvent was coated on a PET resin film with an area of 1 inch, and then the hexane solvent was volatilized and removed in a 100° C. oven for 2 minutes. The thickness of the applied sample, from which the hexane solvent was removed, was approximately 30 μm. The sample-coated PET resin film thus prepared was attached on a stainless steel with an area of 1 inch by applying a pressure at 100° C. for 20 minutes, and slowly cooled to room temperature. Adhesive strength was measured by a peel test using a texture analyzer (manufactured by TA, TA-XT plus). The test was repeated 4 times for each sample, and the mean value was determined for the measurement result. The results of the adhesive strength test are shown in the following Table 3.

TABLE 3

|  | Adhesive strength (g/inch) |
|---|---|
| Comparative Example 2 | 9 |
| Comparative Example 3 | 17 |
| Example 5 | 1614 |

Referring to Table 3, the copolymer of Example 5 satisfying the predetermined molecular weight distribution and density and the relation of Tc−Tm>0 was found to show very excellent adhesive strength. In contrast, the copolymers of Comparative Examples 2 and 3 were found to show poor adhesive strength.

What is claimed is:

1. An olefin-based polymer having a molecular weight distribution (Mw/Mn, PDI) of 2~3 and a density of 0.85 to 0.88 g/cm³, and satisfying the relation of Tc−Tm>0,
    wherein Tc (° C.) is a crystallization temperature and Tm (° C.) is a melting point, and
    wherein the olefin-based polymer has a melt index under a load of 2.16 kg of more than 500 g/10 min and a zero shear viscosity of 20 Pa*S or less.

2. The olefin-based polymer according to claim 1, wherein its weight average molecular weight (Mw) is 1,000 to 80,000.

3. The olefin-based polymer according to claim 1, wherein the olefin-based polymer has a weight average molecular weight (Mw) of 1,000 to 30,000.

4. The olefin-based polymer according to claim 1, wherein its crystallization temperature Tc (° C.) is 60 to 90° C., and its melting point Tm (° C.) is 50 to 70° C.

5. The olefin-based polymer according to claim 1, wherein it is an ethylene-alpha olefin copolymer.

6. The olefin-based polymer according to claim 5, wherein the alpha olefin includes one or more selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene.

7. The olefin-based polymer according to claim 5, wherein the molar ratio of ethylene:alpha olefin is 1:100 to 100:1.

8. A preparation method of the olefin-based polymer of claim 1, comprising the step of polymerizing olefin-based monomers in the presence of a catalyst composition including a transition metal compound of the following Chemical Formula 1 and one or more co-catalysts selected from the group consisting of the following Chemical Formulae 4 to 6,
    wherein the polymerization step is carried out by addition of hydrogen gas supplied at a flow rate of 3.00 L/h or higher, and the molar ratio of transition metal compound:co-catalyst is 1:10 to 1:10000:

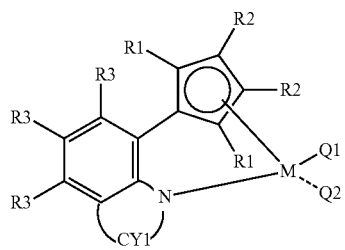

[Chemical Formula 1]

wherein R1 and R2 are the same as or different from each other, and each independently hydrogen; an alkyl radical having 1 to 20 carbon atoms; an alkenyl radical having 2 to 20 carbon atoms; an aryl radical having 6 to 20 carbon atoms; a silyl radical; an alkylaryl radical having 7 to 20 carbon atoms; an arylalkyl radical having 7 to 20 carbon atoms; or a Group 4 metalloid radical substituted with hydrocarbyl; or R1 and R2 or two R2s are connected to each other by an alkylidene radical containing an alkyl radical having 1 to 20 carbon atoms or an aryl radical having 6 to 20 carbon atoms so as to form a ring;

R3s are the same as or different from each other, and each independently hydrogen; a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or amido radical; or two or more of R3s are connected to each other so as to form an aliphatic or aromatic ring;

CY1 is a substituted or unsubstituted aliphatic or aromatic ring, wherein CY1 is substituted with a halogen radical; an alkyl radical having 1 to 20 carbon atoms; an alkenyl radical having 2 to 20 carbon atoms; an aryl radical having 6 to 20 carbon atoms; an alkylaryl radical having 7 to 20 carbon atoms; an arylalkyl radical having 7 to 20 carbon atoms; an alkoxy radical having 1 to 20 carbon atoms; an aryloxy radical having 6 to 20 carbon atoms; or an amido radical; or if a plurality of substituents are present, two or more thereof are connected to each other so as to form an aliphatic or aromatic ring;

M is a Group 4 transition metal; and

Q1 and Q2 are the same as or different from each other, and each independently a halogen radical; an alkyl radical having 1 to 20 carbon atoms; an alkenyl radical having 2 to 20 carbon atoms; an aryl radical having 6 to 20 carbon atoms; an alkylaryl having 7 to 20 carbon atoms; arylalkyl radical having 7 to 20 carbon atoms; an alkyl amido radical having 1 to 20 carbon atoms; an aryl amido radical having 6 to 20 carbon atoms; or alkylidene radical having 1 to 20 carbon atoms,

[Chemical Formula 4]

—[Al(R8)-O]$_n$— wherein R8s are the same as or different from each other, and each independently halogen; a hydrocarbon having 1 to 20 carbon atoms; or a hydrocarbon having 1 to 20 carbon atoms which is substituted with halogen; and n is an integer of 2 or more;

[Chemical Formula 5]

D(R8)$_3$ wherein R8 is the same as defined in Chemical Formula 4; and D is an aluminium or boron;

[Chemical Formula 6]

[L-H]$^+$[ZA$_4$]$^-$ or [L]$^+$[ZA$_4$]$^-$ wherein L is a neutral or cationic Lewis acid; H is a hydrogen atom; Z is an element of Group 13; and As are the same as or different from each other, and each independently an aryl group having 6 to 20 carbon atoms, or an alkyl group having 1 to 20 carbon atoms, at which one or more hydrogen atoms are unsubstituted or substituted with halogen, hydrocarbon having 1 to 20 carbon atoms, alkoxy, or phenoxy.

9. The preparation method according to claim 8, wherein the olefin-based monomer includes ethylene and alpha olefin.

10. The preparation method according to claim 9, wherein the alpha olefin includes one or more selected from the group consisting of 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene.

11. The preparation method according to claim 8, wherein the polymerization step is carried out by a continuous solution polymerization process.

12. The preparation method according to claim 11, wherein the solvent for the continuous solution polymerization process is one or more selected from the group consisting of an aliphatic hydrocarbon solvent having 5 to 12 carbon atoms, an aromatic hydrocarbon solvent, and a hydrocarbon solvent substituted with chlorine.

* * * * *